UNITED STATES PATENT OFFICE.

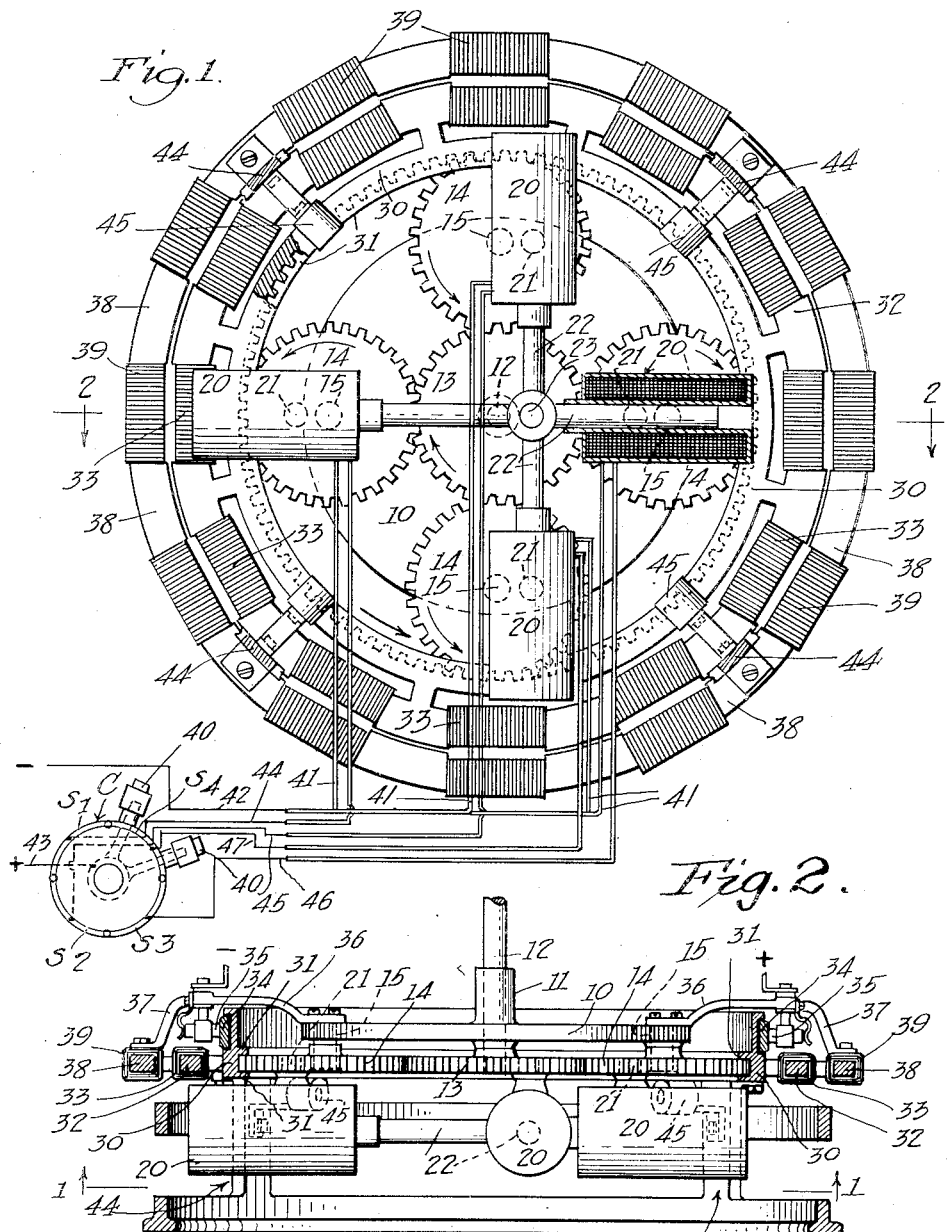

ORLANDO E. KELLUM, OF LOS ANGELES, CALIFORNIA.

MOTOR.

1,356,290.  Specification of Letters Patent.  Patented Oct. 19, 1920.

Application filed March 10, 1920. Serial No. 364,771.

*To all whom it may concern:*

Be it known that I, ORLANDO E. KELLUM, a citizen of the United States, residing at Los Angeles, in the county of Los Angeles, State of California, have invented new and useful Improvements in Motors, of which the following is a specification.

This invention relates to motor mechanisms which, although adapted or applicable to a variety of uses where a synchronous motor is desired, is particularly adapted to situations where exact synchronism of operation is a requisite. Such a situation obtains in the synchronous actuation and control of moving picture mechanisms and phonographs, or other sound producing instruments, pianos, orchestras, etc. In connection with such mechanisms it is necessary that exact synchronism be maintained at all times.

I have described a form of reciprocating electro-magnetic motor in my Patent No. 1,027,658, dated May 28th, 1912. An object of the present invention is to provide a more efficient motor mechanism for such a situation as set forth in my said patent, or for any other similar situation which requires synchronism in control. It is an object of the invention to obtain as nearly as possible the efficiency of operation of a rotating type of electric motor, and still keep the accuracy of synchronism obtainable by a reciprocating type of motor; and it is an object to provide a motor mechanism obtaining such efficiencies and accuracies in a single piece of mechanism, and compact.

The features of my invention whereby these objects are obtained; and further objects and advantageous features of the invention; and the invention as a whole; will all be best understood from the following description of a specific form of motor mechanism embodying the invention. This description, and the accompanying drawings, I make full and complete in detail, as to one specific form of the invention; seeking thereby to make my invention most clearly intelligible, but not at all intending to limit the invention to the particulars and details set forth. For the purpose of this detailed description I refer to the accompanying drawings, in which—

Figure 1 is a face view of a motor constructed in accordance with my invention; and Fig. 2 is an edge view of the same, parts being in section. In describing this specific and preferred form of device, it is to be noted that I describe certain parts as being relatively stationary, and other parts as being relatively rotatable; but it will be readily understood that such rotation is relative only and that those parts which I describe as stationary, may rotate, while those parts which I describe as rotary may be stationary.

The frame of the machine, which may form the member by which it may be supported, may be a disk shown at 10. This disk 10 carries a bearing 11 for the main shaft 12 of the machine. On main shaft 12 there may be mounted a gear 13 which is, in this particular case, a rotatable gear. Spaced around gear 13 there are gears 14, shown in this particular case as being four in number, although any suitable number may be used. Gears 14 mesh with central gear 13 and are mounted on stub shafts 15 carried by disk 10. Disk 10 being stationary in this instance in my invention, the shafts 15 are stationary and the motion of gears 14 is simply one of rotation about their respective centers. Each gear 14 carries a solenoid 20, preferably of the iron clad type, swingingly mounted on the gear on a pivot shown at 21. Each solenoid has a movable core 22, and the four cores of the solenoids connect to a crank pin 23 mounted on the central gear 13. It does not matter whether the four cores 22 are rigid with relation to each other or are independently pivotally connected to the crank pin 23.

Surrounding gears 14 there is a circular gear ring 30 adapted to rotate in mesh with the four gears 14. This gear ring 30 has side flanges 31 to keep it upon the gears 14. It, and the gears 14, may be made of non-magnetic material. An armature ring 32 is carried by the gear ring 30, this armature ring being provided with suitable armature windings 33 in any suitable arrangement, size, and number. A commutator 34 is carried by the ring 30, and brushes 35 may be carried by brackets 36. The brackets 36 have extensions 37 which attach to and support the field ring 38; the brushes and the field ring being thus supported stationarily upon the disk 10. The field ring 38 may be provided with suitable field windings 39, of any desired number, size and arrangement.

If it is desired to mount the motor in a horizontal plane, a supporting base 44 may be arranged as indicated in Fig. 2. This base may directly support the field ring 38; the disk 10 and other parts then being supported from the field ring by the brackets 36. Rollers 45 may then be placed under the armature ring to carry its weight.

The rotating motor construction herein described may be made to operate with alternating current, or direct current; and may, generally speaking, be made to operate either on a continuous current or on a current which is supplied in successive impulses. However, for the purposes of this specific form of my invention, I show a direct current motor adapted to be actuated by a continuous current. In this particular case the arrangement is made such that the armature of the rotating motor tends to rotate in the direction indicated by the arrow in Fig. 1—that is, in a counter-clockwise direction; although, for certain purposes, the arrangement may be made such as to cause rotation in the opposite direction.

The reciprocating motor mechanism, which includes the solenoid 20, is operated by an interrupted or impulse current, successive impulses being distributed to the several solenoids. Such impulses are commonly controlled by a commutator C, such as is shown in diagram in Fig. 1. I have here shown a commutator with four segments and with a double brush arrangement at 40. One side of each of the solenoids is connected by wires 41 to a common feed wire 42. The other feed wire 43 leads to the brushes 40. From commutator segments $S^1$, $S^2$, $S^3$ and $S^4$, wires 44, 45, 46 and 47 lead to the other sides of the solenoids, in rotative succession. In the position shown in the drawings, and with the commutator brushes rotating about the commutator in the direction indicated by the arrow, it will be seen that contact is now made with segment $S^4$ and that current is accordingly being supplied to the lowermost solenoid 20, causing it to attract its core and causing rotation of the central gear 13 in the direction indicated by the arrow thereon. As the commutator brush rotates, it soon comes into contact with segment $S^1$ and current is thereby supplied to the left-hand solenoid 20; the gear 13 having in the meantime rotated somewhat in the direction indicated by the arrow thereon. Through the action of the two brushes 40, current is now supplied to this solenoid 20 through something a little less than half a revolution of the mechanism. It will be seen, without the necessity of further detailed description, that in each successive quarter revolution of the commutator mechanism, current is supplied to a solenoid, and that current continues to be supplied to that solenoid for something less than a half a revolution of the mechanism. By this manner of supplying current, the solenoid motor mechanism will of course be operated in synchronism with the commutator mechanism. Owing to the nature of this operation, and the construction of the solenoid motor mechanism, it is impossible for the solenoid motor mechanism and the commutator mechanism to get out of step; for any given position of the commutator, there is only one possible operative position of the solenoid motor mechanism. The reciprocating motor cannot run ahead of the commutator because each core, at the end of each magnetically attracted stroke, reaches a point of greatest magnetic attraction, and will be held there by the solenoid if the current is not then cut off by the commutator—in other words, if the motor tends to run ahead of the commutator.

The number of commutator segments which are used in practice, and the number of solenoids in the motor mechanism, depend very largely upon the speed at which the motor is made to operate. In order to obtain good efficiency from the rotating motor, it is desirable to operate at a fairly high speed; and accordingly, a comparatively few solenoids in the solenoid motor will suffice to cause synchronous operation. If, however, the motor is designed for comparatively low speed, it may then be desirable to increase the number of solenoids so as to obtain more accurate control of the rotation of the rotary parts of the motor.

It will be seen that the centers 21 by which the solenoids 20 are mounted upon gears 14 are offset from centers of those gears; and the gears are put into mesh in such a manner that, by rotation of the gears 13 and 14, the centers 21 move in such a manner in relation to the movement of crank pin 23 as to increase the relative movements between the solenoids and their respective core 22. The amount of offset of centers 21 from centers 15 may be varied; in this case I show it the same as the offset of crank pin 23 from shaft 12. A double length stroke of the cores relative to the solenoids is thereby obtained without the necessity of making a large crank stroke of the solenoid cores.

In using my motor mechanism the rotary motor is intended to do a part of the work, and the reciprocating motor the remainder of the work. The reciprocating motor can be operated from any suitable circuit—alternating current, direct current, battery circuit, etc. In practice, in order to obtain the highest efficiency, it is designed that the rotary motor do the major portion of the work; while the reciprocating motor mechanism does only just enough to fully and efficiently control the rotary movement. For instance, as applied to any given machine which has a certain resistance to movement, the rotary motor will be so constructed, or controlled by rheostat or any other well known means, that it, for instance, will almost, but not quite, suffice to operate the machine. The reciprocating motor mechanism will be constructed, or controlled, so as to supply a sufficient excess energy to then cause the operation of the machine. Seeing thus that the machine cannot be operated without the assistance of the reciprocating motor; and seeing that the reciprocating motor can only act in synchronism with the commutator, it will be readily apparent that the whole motor mechanism, under such conditions, must necessarily act in synchronism with the commutator.

Or, on the other hand, the arrangement may be made such that the reciprocating motor mechanism, instead of acting as a "booster" may act as a retarder. For instance, the arrangement of the windings, etc., may be made so that the rotary motor tends to rotate the mechanism in one direction while the reciprocating motor tends to rotate in the opposite direction. Thus, in the drawings, it may be conveniently supposed that the rotating motor tends to rotate the ring 30 in the direction opposite to that indicated by the arrow. In such a case the rotating motor will be constructed, or controlled, to deliver a power somewhat in excess of the power necessary to operate the machine to which the motor is applied. It will be apparent that when the reciprocating motor mechanism is energized, it will of course act as a retarder rather than a booster. And the reciprocating motor mechanism will, in this case, be constructed, or controlled, so as to deliver, when in full operation, enough, or a little more than enough, retarding energy as to nullify the energy delivered by the rotary motor in excess of the energy actually required to operate the machine to which the motor is attached. The result of this arrangement is that the mechanism, once started in the same relative position with relation to the commutator that it has when acting as a booster, will immediately lag a little. This will result of course in a lowered efficiency of action of the reciprocating motor, reducing its retarding action until the power of the rotary motor minus the power of the reciprocating motor is just sufficient to operate the machine. The whole mechanism will then continue to rotate at an even speed in synchronism with the commutator, with the motor always in a certain constant position with relation to the commutator.

Having described a preferred form of my invention, I claim:

1. A unitary electric motor embodying an electrically operated rotary motor mechanism, and an electrically operated reciprocating motor mechanism.

2. A unitary electric motor, embodying an electrically operated rotary motor mechanism which includes a relatively stationary field and a relatively rotatable armature, and embodying an electrically operated reciprocating motor mechanism which includes a rotary part rotatively connected to the rotating armature.

3. A unitary electric motor, embodying an electrically operated rotary motor mechanism which includes a relatively stationary field and a relatively rotatable armature, a ring gear rotating with the armature, and embodying an electrically operated reciprocating motor mechanism which includes a plurality of solenoids and cores and a rotatable gear with a crank to which the cores are connected; said gear being located internally of the ring gear, and gearing connecting between the ring gear and the crank gear.

4. A motor, embodying a central gear with a crank, a plurality of gears surrounding and in mesh with the central gear, a solenoid pivotally mounted on each of the surrounding gears, a core for each solenoid connected with the crank, a ring gear surrounding and meshing with the last mentioned gears, a rotary armature mounted on and carried by the ring gear, and a field ring coöperating with said armature.

5. A motor, embodying a central gear with a crank, a plurality of gears surrounding and meshing with the central gear, a solenoid pivotally mounted on each of the central gears on pivots which are spaced from the centers of the gears, a core for each solenoid connected with the crank, a ring gear surrounding and meshing with the last mentioned gears, a rotary armature mounted on and carried by the ring gear, a field ring coöperating with said armature, and a frame upon which the plurality of surrounding gears is mounted and which frame connects with the field ring.

6. A unitary electric motor embodying an electrically operated rotary motor mechanism, and an electrically operated reciprocating motor mechanism; and means for supplying the reciprocating motor mechanism with periodic electric impulses.

7. A unitary electric motor, embodying an electrically operated rotary motor mechanism which includes a relatively stationary field and a relatively rotatable armature, a ring gear rotating with the armature, and embodying an electrically operated reciprocating motor mechanism which includes a plurality of solenoids and cores and a rotatable gear with a crank to which the cores are connected; said gear being located internally of the ring gear, and gearing connection between the ring gear and the crank gear; and means for supplying the several solenoids successively with electrical impulses.

8. A motor, embodying a central gear with a crank, a plurality of gears surrounding and meshing with the central gear, a solenoid pivotally mounted on each of the central gears on pivots which are spaced from the centers of the gears, a core for each solenoid connected with the crank, a ring gear surrounding and meshing with the last mentioned gears, a rotary armature mounted on and carried by the ring gear, a field ring coöperating with said armature, and a frame upon which the plurality of surrounding gears is mounted and which frame connects with the field ring; and means for supplying the several solenoids with electrical impulses in successive sequence in rotation around the central gear.

In witness that I claim the foregoing I have hereunto subscribed my name this 1st day of March, 1920.

ORLANDO E. KELLUM.

Witness:
VIRGINIA I. BERINGER.